United States Patent Office 3,319,349
Patented May 16, 1967

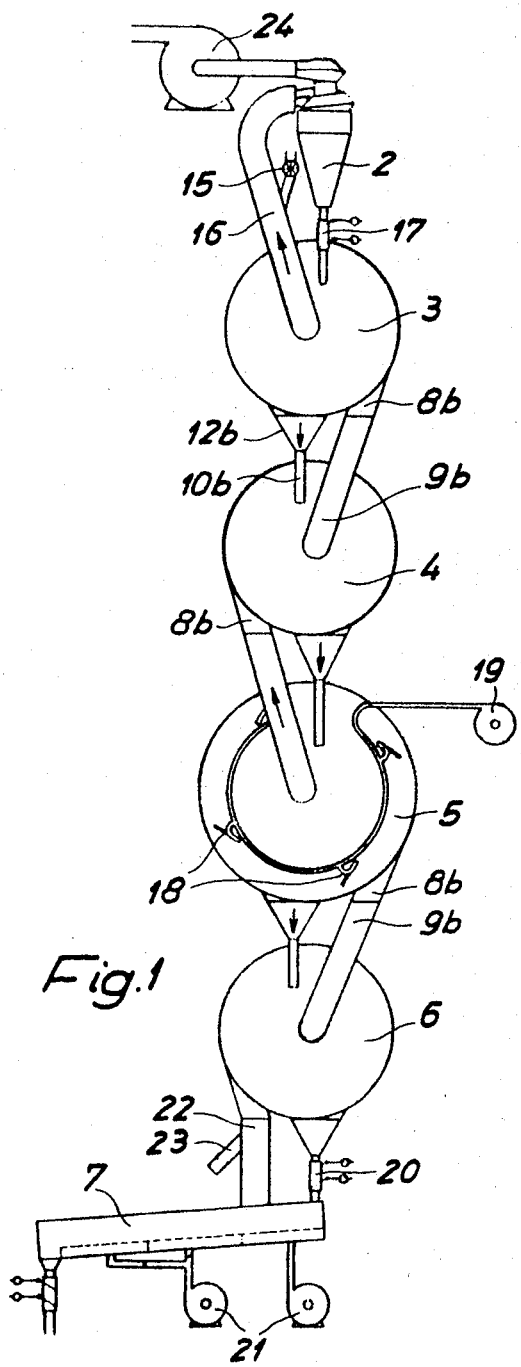
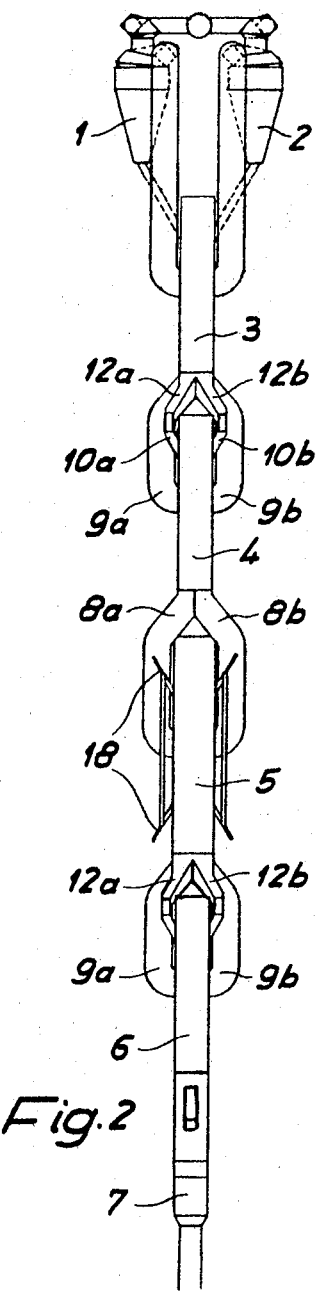

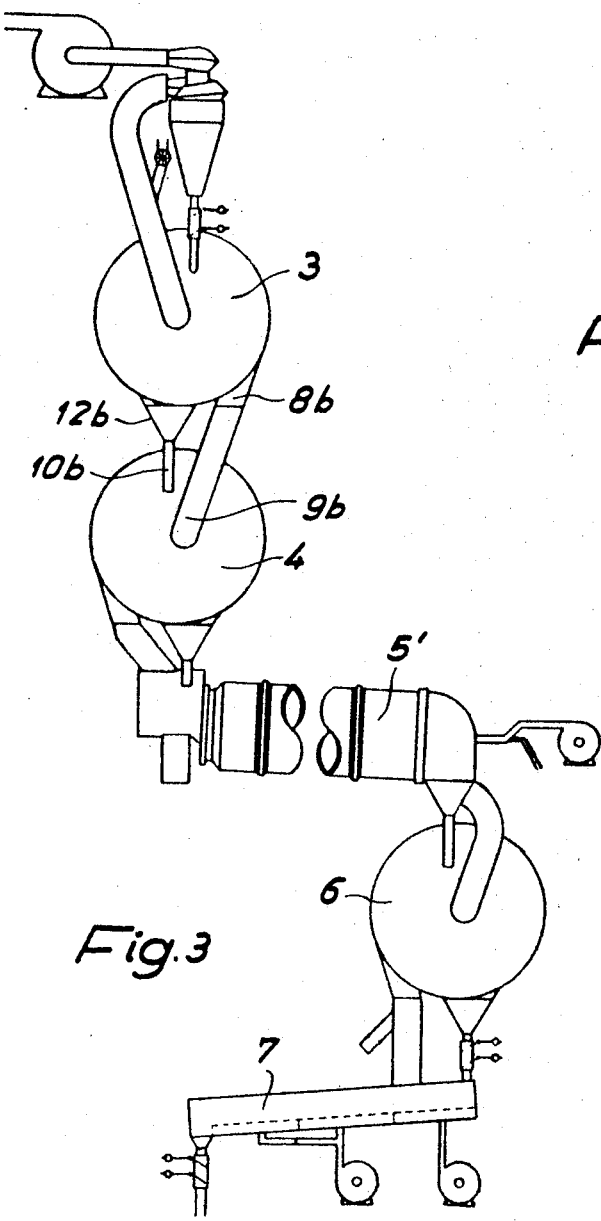
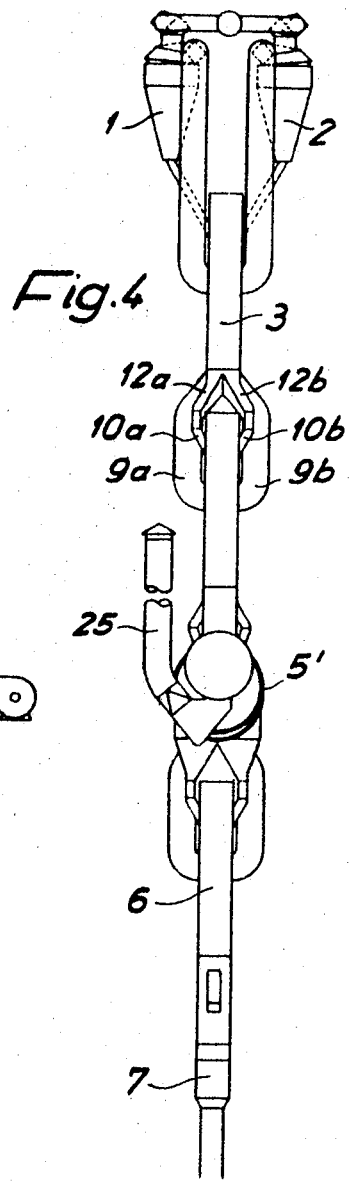

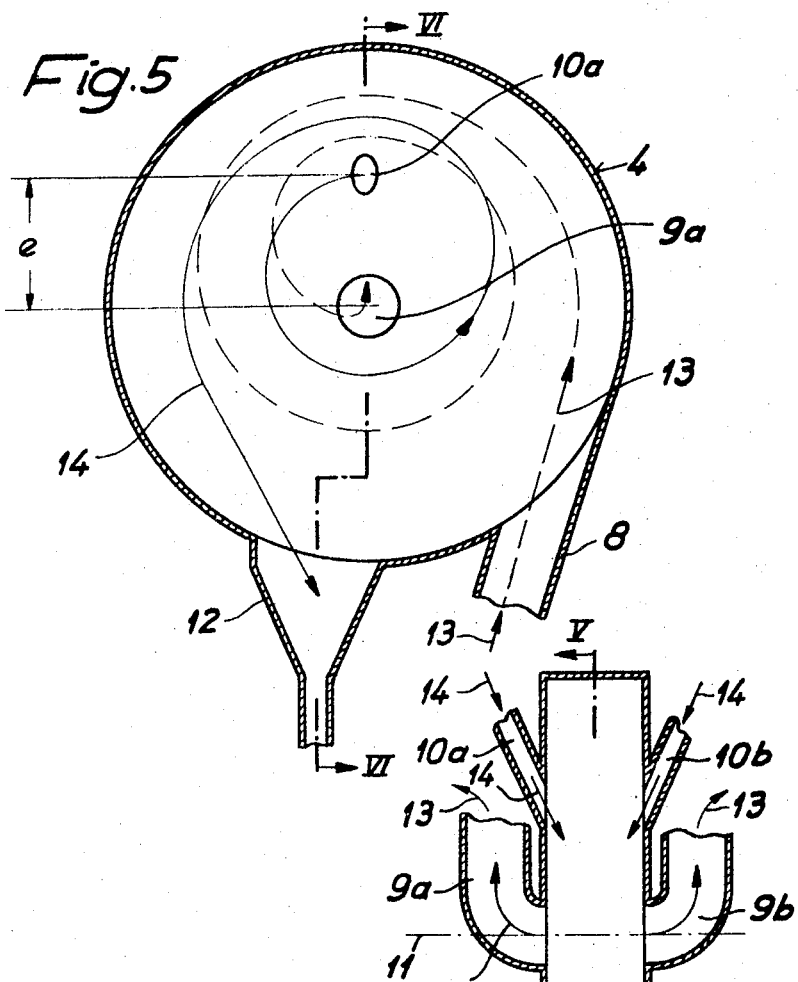

3,319,349
HEAT EXCHANGE APPARATUS FOR CARRYING OUT CHEMICAL AND PHYSICAL REACTIONS
Otto Heinemann, Neubeckum, Germany, assignor to Polysius G.m.b.H., Neubeckum, Germany
Filed Feb. 10, 1965, Ser. No. 431,598
Claims priority, application Germany, July 4, 1964, P 34,634
9 Claims. (Cl. 34—57)

The present invention relates to an apparatus for carrying out chemical and physical reactions between two media of different state of aggregation or of noticeably different specific weight. The invention is particularly directed to a device of the type just mentioned for heating or cooling fine granular or pulverous material by means of a gas flow and comprises a plurality of successive or serially arranged reaction chambers in which the material is passed in counter-current flow with regard to the gas flow.

Devices of this type are employed, for instance, for heating, burning and cooling of cement raw meal, lime, dolomite, magnesite, hydrate of alumina or aluminum hydroxide, and the like. With the heretofore known apparatuses for heating fine granular solid material, the reaction chambers are formed by cyclones which are arranged in two vertical rows in superimposed arrangement in such a way that the respective cyclone which in upward direction follows the adjacent lower cyclone pertains to the respective other row, while the gas discharge pipe of each cyclone extends first vertically upwardly and then horizontally to the next following cyclone. The dust discharge pipe of the next higher cyclone of the same row extends into the vertical portion of the gas discharge pipe.

In order to prevent the discharge gases from entering directly into the next superimposed cyclone of the same row, i.e. the second adjacent cyclone, while passing through the dust discharge pipe and bypassing the next cyclone, heretofore known installations of the type mentioned, and other similar arrangements have the dust discharge pipes equipped with gas-tight material charging valves, for instance a so-called pendulum flap valve.

Material charging valves of this type have considerable drawbacks. While such valves work properly at low temperatures, considerable difficulties are encountered when higher temperatures are involved. Moreover, these material charging valves impede a uniform flow of the material and thereby affect the heat exchange. These mechanically movable parts also frequently present a source of disorder and therefore require frequent and careful servicing.

It is, therefore, an object of the present invention to provide an apparatus for carrying out chemical and physical reactions between two media, which will overcome the above mentioned drawbacks.

It is another object of this invention to provide an apparatus of the general type set forth above, which will not require material charging valves as they have heretofore been necessary in devices of the type involved.

These and other objects and advantages of the invention will appear more clearly from the following specification in connection with the accompanying drawings, in which:

FIG. 1 is a side view of a first embodiment of an apparatus according to the present invention.

FIG. 2 is an end view of an apparatus according to FIG. 1.

FIG. 3 is a side view of a modification of the apparatus shown in FIG. 1 and differs therefrom primarily in that a rotary furnace has been substituted for a cylindrical counter flow burning chamber.

FIG. 4 is an end view of the arrangement of FIG. 3.

FIG. 5 illustrates on a somewhat larger scale than the preceding figures a section through a counter flow chamber, said section being taken along the line V—V of FIG. 6.

FIG. 6 represents a section taken along the line VI—VI of FIG. 5.

The problem underlying the present invention has been solved according to this invention by the employment of substantially cylindrical counter flow chambers into which the gas is tangentially introduced and from which the gas is withdrawn in axial direction, while the material is introduced eccentrically and is withdrawn at the outer circumference of the respective chamber. The location of the material discharge of one counter flow chamber and the location of the material inlet of the next following counter flow chamber, when looking in the direction of flow of the material, are so selected that the pressure at the material inlet will not exceed, i.e. will at best equal the pressure at the material discharge of the preceding counter flow chamber.

In counter flow chambers of the above mentioned type, the tangentially introduced and axially withdrawn gas passes in a vortex depression (wirble Senke) so that at the circumference of the respective chamber a slight overpressure will develop, whereas in the center an increased sub-atmospheric pressure will occur. If now, in conformity with the present invention, the material discharge or outlet which is under slight over-pressure of one counter flow chamber, is connected with the material inlet which is under increased sub-atmospheric pressure and pertains to the next following counter flow chamber, it is possible by suitably selecting the inlet and outlet location (i.e. the connections with the material feeding line), also taking into consideration the flow losses in the counter flow chambers and in the gas conduits interconnecting the chambers, to assure that the pressure at the material inlet will at the maximum equal the pressure at the material outlet of the preceding counter flow chamber.

Under the above conditions, the material flowing from one counter flow chamber to the next counter flow chamber will in the material feeding line not encounter counter flowing gas. Consequently, a material charging valve will not be required, thereby greatly simplifying the construction of the installation and contributing greatly to an improvement in the safety of operation of the apparatus. In addition thereto, the undisturbed continuous flow of the material through the material feeding line also yields a considerably better heat exchange whereby the economy and the output of the apparatus will be greatly increased.

In connection with the present invention, it is advantageous so to design the cylindrical counter flow chambers that their height is a fraction of the diameter of the chamber, and that the axes of the chambers extend substantially horizontally and that the material is discharged in the lower range of the counter flow chamber and enters the next following counter flow chamber at least at one of the two broadest sides of the chamber substantially above the axis thereof at a downwardly directed incline.

The eccentricity of the material inlet is advantageously between 0.1 and 0.7 times, preferably 0.4 times the radius of the chamber. The value suitable for the respective individual instance is generally so determined that while taking into consideration the counter flow conditions in the counter flow chambers in the material feeding pipe, no pressure drop or no material pressure drop when looking in the direction of flow of the material will exist between directly succeeding counter flow chambers.

In order to obtain an intensive and uniform contact between the material and the gas flow, the material is advantageously introduced into the counter flow chamber at an angle from 30 to 80°, preferably 60° with regard to the axis of the chamber.

According to the invention, the counter flow chambers have advantageously at their two broad sides two material inlets each which are arranged symmetrically with regard to the vertical central plane of the chamber.

Referring now to the drawing in detail and FIGS. 1 and 2 thereof in particular, the arrangement shown therein comprises primarily two cyclones 1 and 2, a first counter flow preheating chamber 3, a second counter flow preheating chamber 4, a burning chamber 5, a cooling chamber 6 and a post-cooling device 7, said chambers and said post-cooling device being arranged one above the other.

As will be seen from the drawing, the preheating chambers 3 and 4 as well as the burning chamber 5 and cooling chamber 6 are designed as substantially cylindrical counter flow chambers. The fundamental design of said chambers is shown more clearly in FIGS. 5 and 6, which show preheating chamber 4 in particular. However, the description as to the design of chamber 4 also applies correspondingly to the other counter flow chambers.

Cylindrical counter flow chamber 4 having a horizontal longitudinal axis has a height which amounts to only a fraction of the diameter of the chamber, as will be clearly seen from FIG. 6. Counter flow preheating chamber 4 is provided with a tangential gas inlet 8 which, as is evident from FIGS. 2 and 6, branches into branch feeding lines 8a and 8b laterally leading into chamber 4. Chamber 4 has its two broad sides provided with one axially arranged gas discharge pipe each, 9a, 9b respectively.

As will also be evident from FIG. 6, two material feeding lines 10a and 10b at both broad sides of chamber 4 lead into the latter above the chamber axis 11. The magnitude of the eccentricity of the inlet of pipes 10a, 10b into chamber 4 has been designated in FIG. 5 with the character e. The material feeding pipes 10a, 10b are arranged at an angle with regard to chamber axis 11 so that the material will enter preheating chamber 4 at an incline directed downwardly. A material discharge pipe 12 communicates by means of its branch pipes 12a, 12b (FIGS. 2 and 6) with the lower range of preheating chamber 4.

The gas passes through tangential inlet pipe 8 into the counter flow preheating chamber 4, passes the latter along the spiral-shaped dash-line path 13 (FIG. 5) and leaves chamber 4 in axial direction through pipes 9a, 9b. The material introduced into chamber 4 through feeding pipes 10a, 10b is by means of the gas caused to carry out a turbulent movement, then passes through chamber 4, for instance along a path indicated by the solid-line 14, and finally leaves chamber 4 through branch pipes 12a, 12b of pipe 12. It will be appreciated that the material in chamber 4 is passed substantially in counter-current flow to the gas.

Due to the turbulent flow of the gas in chamber 4, a slight over-pressure will develop at the inner circumference of chamber 4, whereas in the central chamber range an increased sub-atmospheric pressure will develop. This effect makes possible a serial arrangement of a plurality of such counter flow chambers while material charging valves in the material feeding pipes between the individual chambers become superflous.

To this end, according to the present invention, the material outlet, i.e. the connection for pipe 12 of one counter flow chamber, for instance of chamber 3 (see FIG. 1) and the material inlet, i.e. the inlet of feeding lines 10a, 10b of the next following counter flow chamber, when looking in the direction of flow of the material, in the particular embodiment of FIG. 4 (FIG. 1) are so selected that the pressure at the material inlet will at a maximum equal the pressure at the material outlet of the preceding counter flow chamber 3. Thus, in this instance, in the material feeding pipes between chambers 3 and 4 there will exist no pressure drop at all, or only a very slight pressure drop in the direction of flow of the material. Consequently, the gas will exclusively through pipes 9a and 9b but not through material feeding pipes 10a, 10b leave chamber 4 and enter chamber 3. Consequently, material charging valves are not required in the material feeding pipes 10a, 10b.

The operation of the arrangement shown in FIGS. 1 and 2 will therefore be clear: The fine granular or pulverous material is by means of a metering or dosing device 15 charged into gas pipe 16 leading from preheating chamber 3 to cyclones 1 and 2.

After separation has been effected in the cyclone, the material passes through a material charging valve 17 arranged, for instance at this point, into the preheating chamber 3. Here the material is preheated in counter flow to the gas in the manner described above in connection with FIGS. 5 and 6, and passes through material outlet pipes 12a, 12b of chamber 3 and material feeding pipes 10a, 10b of the succeeding preheating chamber 4 into the latter. No material charging valves are provided in the connecting pipes between preheating chambers 3 and 4 which serve as feeding pipes for the material. Also, no material charging valves are provided in the corresponding connecting pipes between preheating chamber 4 and burning chamber 5.

Burning chamber 5, the design of which corresponds substantially to that of chamber 4 described in connection with FIGS. 5 and 6, has additionally a plurality of burners 18 arranged at its two broad sides, said burners 18 being supplied with primary air by means of a blower 19. The material enters burning chamber 5 likewise eccentrically and passes through chamber 5 in counter flow to the hot gas.

Subsequently, the material passes into cooling chamber 6 while, similar to the preceding stages, the connections of the connecting pipes serving for feeding the material are again so selected that in thees pipes no pressure drop will occur in a direction counter to the direction of flow of the material.

From cooling chamber 6, the material passes through a material charging valve 20 into the post-cooling device 7. The cooling air furnished by blowers 21 passes through a conduit 22 into cooling chamber 6, while additional cooling air may be drawn in through a further conduit 23. The heated cooling air which flows off from cooling chamber 6 through pipes 9a and 9b enters in the form of secondary air the burning chamber 5 in tangential direction and leaves said chamber 5 in axial direction whereupon it is passed in the manner mentioned above successively through preheating chambers 4 and 3. After passing through cyclones 1 and 2, the discharged gases are by means of a blower 24 conveyed to a post dust-removing device.

Referring now to the embodiment of FIGS. 3 and 4, the arrangement shown therein differs from the embodiment of FIGS. 1 and 2 primarily in that the cylindrical counter flow burning chamber 5 of FIGS. 1 and 2 has been replaced by a rotary furnace 5' which permits the material to remain in its burning stage for a longer period of time. For starting the arrangement, an auxiliary flue 25 is provided which is adapted to be made ineffective. In all other respects, the arrangement of the individual stages, especially the connection to the material feeding pipe between the individual chambers, and the gas and material feeding corresponds to that of the embodiment of FIGS. 1 and 2.

It is, of course, to be understood, that the present invention is, by no means, limited to the particular arrangements shown in the drawings, but also comprises any modifications within the scope of the appended claims.

What I claim is:

1. An apparatus for carrying out chemical and physical reactions between two media, especially for heating and cooling fine granular and pulverous materials moving in a counter current flow with regard to a gas flow, which includes: a plurality of serially arranged substantially cylindrical reaction chambers each having a tangential gas inlet and an axial gas outlet, for the passage of gas therethrough along an inwardly spiraling path, the gas outlet of one reaction chamber being connected to the gas inlet of the reaction chamber next following in the direction of gas flow, each of said reaction chambers also having an eccentricaly located material inlet and an outer peripheral material outlet for the passage of material therethrough along an outwardly spiralling path, the material inlet of the said next following reaction chamber being connected to the material outlet of said one reaction chamber, the radial location of the material outlet of each of said chambers and the location of the material inlet of the respective next succeeding one of said chambers when looking in the direction of flow of the material from one chamber to the next chamber being so selected that the gas pressure at the said material inlet of said one reaction chamber at maximum equals the gas pressure at the said material outlet of the said next following reaction chamber.

2. An apparatus for carrying out chemical and physical reactions between two media, especially for heating and cooling fine granular and pulverous materials moving in a counter current flow with regard to a gas flow, which includes: a plurality of serially arranged substantially cylindrical reaction chambers each having a width representing a fraction of the chamber diameter and having its central transverse axis arranged substantially horizontally, each of said chambers having tangential gas inlet means and axial gas outlet means for the passage of gas therethrough along an inwardly spiralling path, each of said chambers also having eccentrically located material inlet means opening laterally into the respective chamber above its central transverse axis and furthermore having outer peripheral material outlet means below said central transverse axis for the passage of material therethrough along an outwardly spiralling path, said material inlet means being located in at least one of the end faces of the respective chambers, each gas outlet means being connected to the gas inlet means of the next following chamber for the passage of gas through said chambers in series in one direction, and conduit means connected to the respective material outlet means of each chamber and respectively leading to the material inlet means of the respective next preceding chamber when looking in the direction of flow of gas from one chamber to the next chamber for the passage of material through said chamber in series in the other direction, said conduit means having the axis thereof forming an acute angle with said central transverse axis of the respective adjacent chamber, the locations of the material outlet means of each of said chambers and of the material inlet means of the respective next preceding one of said chambers when looking in the direction of flow of gas from one chamber to the next chamber being so selected that the gas pressure at the material inlet means of each of said chambers at maximum equals the gas pressure at the material outlet means of the respective succeeding chamber.

3. An apparatus according to claim 2, in which the eccentricity of the material inlet means with regard to said central transverse axis amounts to from 0.1 to 0.7 times the diameter of the respective chamber.

4. An apparatus according to claim 2, in which the eccentricity of the material inlet means with regard to said central transverse axis amounts to 0.5 times the diameter of the respective chamber.

5. An apparatus according to claim 2, in which said acute angle amounts to from 30 to 80°.

6. An apparatus according to claim 2, in which said acute angle amounts to approximately 60°.

7. An apparatus for carrying out chemical and physical reactions between two media, especially for heating and cooling fine granular and pulverous materials moving in a counter current flow with regard to a gas flow, which includes: a plurality of serially arranged substantially cylindrical reaction chambers each having a width representing a fraction of the chamber diameter and having its central transverse axis arranged substantially horizontally, each of said chambers having tangential gas inlet means and axial gas outlet means for the passage of gas therethrough along an inwardly spiralling path, each of said chambers also having two material inlet means respectively arranged in each of its end faces and located eccentrically with regard to its central transverse axis and above the same and opening laterally into the chamber for the passage of material therethrough along an outwardly spiralling path, gas outlet means of each chamber being connected to the gas inlet means of the following chamber for flow of gas through said chambers in series in one direction, and conduit means connected to the respective material outlet means of each chamber and respectively leading to the material inlet means of the respective next preceding chamber when looking in the direction of flow of gas from one chamber to the next chamber, said conduit means having the axis thereof forming an acute angle with said central transverse axis of the respective adjacent chamber, the locations of the material outlet means of each of said chambers and of the material inlet means of the respective next succeeding one of said chambers when looking in the direction of flow of the material from one chamber to the next chamber being so selected that the gas pressure at the material inlet means of each of said chambers at maximum equals the gas pressure at the material outlet means of the respective following chamber.

8. An apparatus for carrying out chemical and physical reactions between two media, especially for heating and cooling fine granular and pulverous materials moving in a counter current flow with regard to a gas flow, which includes: two cyclones adapted to receive fine granular and pulverous materials; a first counter flow preheating chamber; first material conveying conduit means leading from said cyclones to said first chamber; a plurality of additional chambers respectively serially arranged with regard to each other and with regard to said first chamber when looking in the direction of flow of the material from said cyclones to said first chamber; said additional chambers including a counter flow preheating chamber, a counter flow cooling chamber and a counter flow burning chamber; each of said chambers having tangential gas inlet means and axial gas outlet means for the flow of gas therethrough along an inwardly spiralling path, each chamber also having eccentrically located material inlet means and also having outer peripheral material outlet means for the flow of material therethrough along an outwardly spiralling path, said first material conveying conduit means being connected to the material inlet means of said first chamber, the material outlet means of each chamber being connected to the material inlet means of the next following chamber means considered in the direction of material flow through said chambers, the gas outlet means of each chamber being connected to the gas inlet means of the next following chamber considered in the direction opposite the direction of material flow through said chambers, the location of the material outlet means of each of said chambers and of the material inlet means of the respective next succeeding one of said chambers when looking in the direction of flow of the material from one chamber to the next chamber being so selected that the gas pressure at the material outlet means of each of said chambers at maximum equals the gas pressure at the material outlet means of the respective preceding chamber; and post-cooling means following the last one of said additional chambers connected to the material outlet means thereof for receiving material therefrom and operative for post-cooling the material passed through all of said chambers.

9. An apparatus for carrying out chemical and physical reactions between two media, especially for heating and cooling fine granular and pulverous materials moving in a counter current flow with regard to a gas flow, which includes: two cyclones adapted to receive fine granular and pulverous materials and having material outlet means;

a first counter flow preheating chamber; a plurality of additional chambers respectively serially arranged with regard to each other and with regard to said first chamber when looking in the direction of flow of the material from said cyclones to said first chamber; said additional chambers including a counter flow preheating chamber and a counter flow cooling chamber, rotary furnace means; each of said chambers having tangential gas inlet means and axial gas outlet means and also having eccentrically located material inlet means and also having outer peripheral material outlet means; said rotary furnace having gas inlet means and gas outlet means and material inlet means and material outlet means, said gas inlet means and said gas outlet means being connected for the flow of gas through said chambers and furnace serially in a direction toward said first chamber, said material inlet means and material outlet means being connected for the flow of material through said chamber and furnace in a direction away from said first chamber, the location of the material outlet means of each of said chambers and of the material inlet means of the respective next succeeding one of said chambers when looking in the direction of flow of the material from one chamber to the next chamber being so selected that the gas pressure at the material outlet means of each of said chambers at maximum equals the gas pressure at the material outlet means of the respective preceding chamber; and post-cooling means following the last one of said additional chambers and connected to the material outlet means thereof to receive material therefrom and operable for post-cooling the material passed through all of said chambers; said rotary furnace means being interposed between said counter flow cooling chamber and the directly preceding counter flow preheating chamber.

References Cited by the Examiner

UNITED STATES PATENTS

| | | | |
|---|---|---|---|
| 2,733,909 | 2/1956 | Engelhart | 263—32 |
| 2,757,921 | 8/1956 | Petersen | 263—52 |
| 3,049,343 | 8/1962 | Helming | 263—32 |
| 3,127,250 | 3/1964 | Heinemann | 263—21 |

FOREIGN PATENTS 1,295,875   2/1962   France.

FREDERICK L. MATTESON, JR., *Primary Examiner.*

JOHN J. CAMBY, *Examiner.*